(12) United States Patent
Zhang (10) Patent No.: US 7,212,582 B2
(45) Date of Patent: May 1, 2007

(54) COMBINING PRECODING WITH SPECTRAL SHAPING

(75) Inventor: Xuming Zhang, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 799 days.

(21) Appl. No.: 10/301,299

(22) Filed: Nov. 20, 2002

(65) Prior Publication Data
US 2004/0096022 A1   May 20, 2004

(51) Int. Cl.
*H04K 1/02* (2006.01)
(52) U.S. Cl. .................... 375/296; 375/233; 375/232; 375/254
(58) Field of Classification Search ........... 375/353, 375/254, 296, 285, 219, 220, 222, 232, 233
See application file for complete search history.

(56) References Cited

U.S. PATENT DOCUMENTS

| 6,061,407 A * | 5/2000 | Cherubini et al. ......... 375/265 |
| 6,324,220 B1 * | 11/2001 | Sellars ....................... 375/296 |
| 6,597,746 B1 * | 7/2003 | Amrany et al. ............ 375/296 |
| 6,798,851 B1 * | 9/2004 | Dagdeviren ................ 375/340 |
| 2002/0044598 A1 * | 4/2002 | Frenkel et al. ............. 375/232 |

* cited by examiner

*Primary Examiner*—Phuong Phu
(74) *Attorney, Agent, or Firm*—Michael A. Rahman; Gardere Wynne Sewell LLP

(57) ABSTRACT

In one embodiment, a device includes but is not limited to: a precoder having a precoder input and a precoder output; a spectral shaper, having a spectral-shaper transfer function and being operably coupled internal to said precoder; and a precoder filter, internal to the precoder, the precoder filter having a transfer function which provides substantially the inverse of the spectral-shaper transfer function.

7 Claims, 9 Drawing Sheets

Use of Spectral Shaper $S(D)$ in a precoder

FIG. 1

Block diagram of a precoded PAM communications system

FIG. 2

FIG. 3  Spectrum of $x(n)$ when non-uniformly spaced constellation is used

FIG. 4

Use of Spectral Shaper S(D) in a precoder

Transmitter Precoding Process

FIG. 5

Selection of i(n) Process

Transmitter Precoding with Spectral Shaper S(D)

Update Spectral Shaper to minimize $|y(n)|$ (whitened $y(n)$)

FIG. 8

Update Spectral Shaper to minimize RDS (DC notched y(n))

FIG. 9

COMBINING PRECODING WITH SPECTRAL SHAPING

BACKGROUND OF THE INVENTION

1. Field of the Invention

The present application relates, in general, to data communications systems.

2. Description of the Related Art

Data is information that is in a form suitable for manipulation and/or processing in a formalized manner, such as by one or more machines. Data communications systems are systems that transmit and/or receive data through at least one data communications link (e.g., a wireless link, a wire link, or a fiber optic link).

Data communications systems often utilize what are known in the art as "modems." "Modem" is short for modulator-demodulator. A modem is a device or program that enables a computer to transmit data over telephone lines or other communication media. Computer information is stored digitally, whereas information transmitted over telephone lines is transmitted in the form of analog waves. A modem converts between these two forms.

The operations modems perform are complex, and there are many different ways in which such operations may be done. In the early days of data communications, different vendors devised their own unique ways of doing modem operations. In order to communicate, both a transmitting and a receiving station had to use modems which understood the different schemes of the various different vendors, or communications between the two was impossible.

Over time, the industry migrated to a standards based format. Under the standards based format, various international bodies comprised of industry experts specified standards for interfaces and signals between communicating modems, so that the communicating modems did not have to know all the various unique ways in which the various vendors performed their modem operations. The idea underlying standards is that the interfaces and signal exchanges are agreed to, but the various vendors are free to provide such standard interfaces and signal exchanges however they see fit. One such standard is the V.90 modem standard of the International Telecommunication Union (ITU).

The V.90 standard is for 56-Kbps modems and was approved by the International Telecommunication Union (ITU) in February 1998. The V.90 standard was implemented to resolve a battle between two then-competing vendor-created 56 Kbps technologies: X2 from 3COM and K56flex from Rockwell Semiconductor.

The V.90 is essentially a "hybrid" modem standard, in that it specifies that continuous signal standard analog transmission modem techniques (e.g., QPSK modulation) be used to transmit data, from a "client" modem to a "server" modem (e.g., in the "upstream" direction), over the physical data transmission medium spanning the two modems, but that discrete signal Pulse Amplitude Modulation (PAM) be used to transmit data, from the server modem to the client modem (e.g., in the "downstream" direction), over the physical data transmission medium spanning the two modems.

Relatively recently, an improvement upon the V.90 standard, known as the V.92 modem standard, has been approved. In the V.92 modem standard, it has been proposed that discrete signal PAM be used to transmit data, in both the upstream and the downstream directions, over the physical data transmission medium spanning the two modems, typically over unshielded twisted pair lines (UTP).

V.92 is designed to minimize Pulse Code Modulation (PCM) codec quantization noise in both upstream and downstream directions. It employs non-equally spaced constellations to closely match PCM codec quantization levels (e.g. µ-law codec in North America and A-law code in Europe), on an attempt to minimize codec quantization noise. For modern PCM modem design, PCM codec quantization noise is considered one of the dominant impairments that affect modem performance (bit error rate).

There exist several well-known side effects of the use of non-equally spaced constellations, such as increase of peak-to-average (power) ratio (PAR), reduced minimum distance for a given average power and so on. However, quantization noise reduction due to use of PCM (codec-matched) constellation levels significantly outweighs the above "side" effects. Therefore, both V.90 and V.92 modems yield much high data rates than the conventional modem technologies such as V.34 when transmitting over a PCM channel.

BRIEF DESCRIPTION OF THE SEVERAL VIEWS OF THE DRAWINGS

The use of the same symbols in different drawings typically indicates similar or identical items.

DETAILED DESCRIPTION

Table of Contents of Detailed Description
A. Introduction
B. PCM Based Precoding System Architecture of FIG. 1
   1. Digital Data Bit Stream of FIG. 1
   2. Bits-To-PAM Encoder of FIG. 1
      a. Overview of Bits-to-PAM Encoder
      b. Operation of Bits-to-PAM Encoder
   3. Precoder of FIG. 1
      a. Overview of Precoder
      b. Operation of Precoder
         i. Extended PAM Constellation Mapper of Precoder
         ii. Precoder Filter of Precoder
         i(n) Selection Block of Precoder
   4. Prefilter of FIG. 1
      a. Overview of Prefilter
      b. Operation of Prefilter C. Inventor Has Discovered that Precoding Systems Using Non-Equispaced PAM Undesirably Color the Transmit Power Spectrum
  1. When V.92 Architecture Uses Non-Uniformly Spaced PAM, The Transmit Power Spectrum Is Highly Colored
D. Inventor Has Discovered that Precoding System Operation Can Be Combined with Spectral Shaping
  1. Modifying Precoding Architecture to Obtain Desired Spectrum
  2. Inserting A Spectral Shaper Into a Precoding Acrchitecture A. Introduction As noted in the description of the related art, the V.92 standard has been proposed as an improvement on the V.90 standard. As also noted in the description of the related art, the inventor named herein has discovered previously unrecognized problems with a straightforward implementation of the proposed V.92 standard. As will be disclosed below, the inventor has discovered solutions to these problems.

In devising the V.92 standard, the standard designers made changes to the operation of the PAM system. As will be described in more detail below, the inventor named herein ("inventor") has discovered that such changes yield unexpected transmit spectral coloring. If it is not properly corrected, it does in fact adversely affect the operation of the PAM system; such discovery forms part of the inventive content herein.

Figure 1:
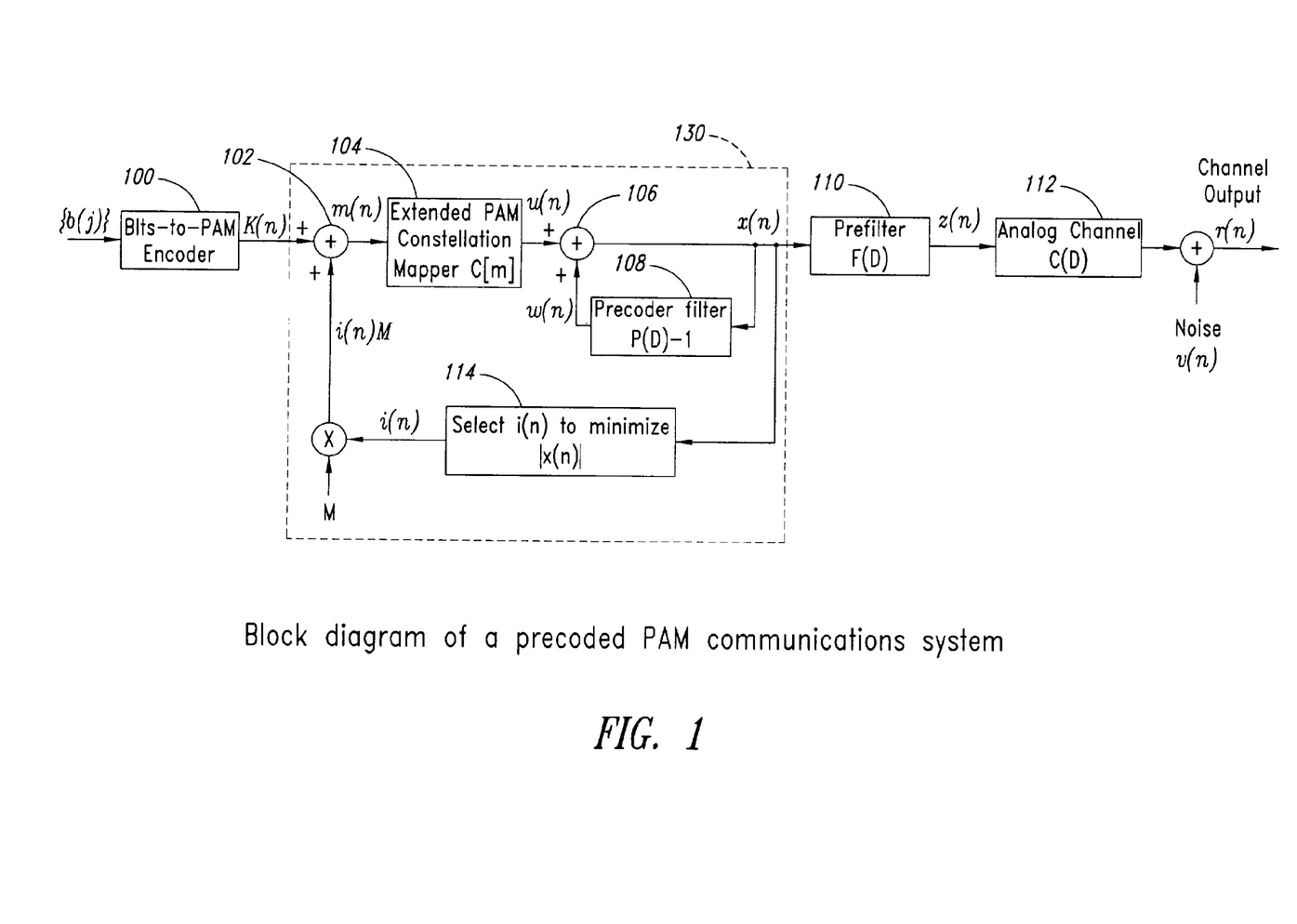
FIG. 1 shows a high-level block diagram of a precoding pulse amplitude modulated (PAM) data communications system architecture 150.

With respect to the PCM based precoding system architecture, it has been discovered by the inventor that, due to non-equally spaced constellations used by extended PAM constellation mapper c[m] 104, the output spectrum of the transmitter precoder 130 will no longer be white and it is normally determined by the analog channel impulse response and constellation used in transmission. For most analog channels of interest, it has been discovered by the inventor that transmit spectrum of a straightforward implementation of the V.92 transmitter as specified in V.92 standard will potentially produce one or multiple spectral spikes at frequencies where analog channel band-edges reside. These unwanted spectral spikes, if unsuppressed, will have damaging impacts such as (1) disrupting local echo cancellation (EC) operation, (2) increasing transmit power, (3) increasing of PAR, (4) exciting of inter-modulation products when passing through a nonlinear device (such as transformer in a hybrid), (5) potentially violating of transmit power spectral density (PSD) mask imposed by regional regulatory rules.

In other applications, where a desired goal is to place spectral nulls at particular frequencies, a common goal is to introduce a null in the spectrum at DC, thereby enabling transmission of a baseband PAM waveform over a channel that cannot accommodate a DC component in the data signal. An alternative for such a channel would be to use passband PAM, but in many applications baseband PAM in conjunction with line coding and/or transmitter precoding is a most cost-effective alternative. See G. D. Forney, Jr. & A. R. Calderbank, propose to add spectral nulls using transmitter precoding (see G. D. Forney, Jr. & A. R. Calderbank, *Cost Codes for Partial Response Channels; or Cost Codes with Spectral Nulls*, IT-35 IEEE Trans. Information, 1989, at 925).

Spectral shaping is not as big an issue in passband systems as baseband, for several reasons. Baseband systems, particularly those operating over unshielded twisted pair cables (e.g. telephone lines) or digital subscriber lines (DSL), typically have a large variation in attenuation over the Nyquist bandwidth and also a large variation in cross-talk coupling loss. Hence, there is much that can be done to improve the performance of these systems by control of the transmitted power spectrum. Passband systems, in contrast, usually have a relative constant attenuation vs. frequency because the bandwidth is narrow relative to the center frequency, and cross-talk coupling may not be an issue or is relatively frequency independent.

The transmit spectrum can be controlled by introducing a controlled correlation among transmit symbols in the form of redundancy. A popular way to control the spectrum is through the design of a line code. See P. A. Franaszek, *Sequence-state coding for digital transmission,* 47 BSTJ, January 1968 at 143; and A. R. Calderband and J. E. Mazo, *Spectral Nulls and Coding with Large Alphabets,* IEEE Comm Mag., December 1991. In the present invention, the inventor proposes a way to control the spectrum through combining precoding and spectral shaping. One major motivation in baseband systems is the problem of baseline wander introduced by the alternating current ("AC") coupling inherent in transformers and broadband amplifiers. The effect of AC coupling in a channel is a form of Intersymbol Interference (ISI) called baseline wander ISI. The undesired baseline wander ISI, a consequence of the zero at DC in the channel response is a major consideration in spectral shaping.

Those having ordinary skill in the art will appreciate that the V.92 standard, as well as the V.90 standard, represents a radical departure from previously-existing modem techniques. In particular, the V.92 standard calls for direct transmission of PAM pulses onto the analog transmission medium spanning a transmitting and a receiving station, rather than modulating an analog carrier as in previously-existing modem techniques.

More importantly, both V.90 and V.92 use non-equally spaced constellations in order to match PCM nonlinear analog-to-digital converter (ADC) or digital-to-analog converter (DAC) quantization levels (mu-law and A-law codec), as well as any digital impairments (Pad and robbed-bit signaling). For V.92 upstream (client to central office) transmission, the analog channel must be equalized before the signal reaches the PCM codec. This dictates that the entire analog channel equalization task in V.92 must be done in a transmitter by using transmit preceding and pre-filtering.

In order to provide a clear understanding of the problems detected by the inventor, as well as the proposed solutions to such problems, the following description is organized as follows. First, a PCM based Precoding System Architecture, representative of the foregoing-referenced straightforward implementation of V.92 standard precoding system architecture, but with additional inventor insights, is described. Second inventor discoveries regarding the fact that precoding systems using non-equispaced PAM (e.g., V.92 Precoding Systems) undesirably color the transmit power spectrum are described. Third, various inventor solutions to the identified problems are described.

B. PCM Based Precoding System Architecture of FIG. 1

With reference to the figures, and with reference now to FIG. 1, shown is a high-level block diagram of a precoder pulse amplitude modulated (PAM) data communications system architecture 150, which is representative of the foregoing-referenced straightforward implementation V.92 standard scheme, but with certain additional inventor insights shown. Depicted is that digital data b(j) serves as an input to bits-to-PAM encoder 100. The output of bits-to-PAM encoder 100 serves as an input to precoder 130 (which is explained in detail below). Shown is that the output of precoder 130 serves as an input to prefilter 110. The output of prefilter 110 feeds to into analog channel 112. Each of the foregoing-referenced portions of the PAM data communications architecture 150 will be described in separately outlined sections, below.

Specifically, the digital data stream, bits-to-PAM encoder 100, precorder 130, and prefilter 110 will now be discussed in more detail.

1. Digital Data Bit Stream of FIG. 1

Illustrated is a data bit stream, {b(j)}, which represents a string of bits (e.g., 101 110 001 . . . ), and which is typically generated by a user (not shown) of the system. The data bit stream, {b(j)}, feeds into bits-to-PAM encoder 100.

2. Bits-To-PAM Encoder of FIG. 1 a. Overview of Bits-to-PAM Encoder

Those having ordinary skill in the art will appreciate that, for any physical transmission medium spanning a transmitting station and a receiving station, there is a finite uppermost limit on how fast the signal on the physical medium can be changed without the signal experiencing severe distortion on its trip to the receiving station. Consequently, it is common in the art to "encode" a series of bits (e.g., three bits) into a "symbol," and thereafter transmit that "symbol" over the communications medium. This encoding scheme allows more bits to be sent between the transmitting station and a receiving station than would be possible should the bits have been sent individually. One way in which the V.92 standard indicates that foregoing may be done is to encode a series of bits into different voltage amplitudes (where each discrete voltage amplitude constitutes a "symbol"), such that each sequence of bits is uniquely paired with a voltage amplitude level. For example, each integer of the 8 (0–7) integers represented by a three-bit string could be uniquely paired with each of 8 discrete voltage levels (e.g., 000 uniquely paired with a first voltage level, 001 uniquely paired with a second voltage level, etc., all the way up to 111 uniquely paired with an eighth voltage level). The foregoing is essentially the function of bits-to-PAM encoder 100.

b. Operation of Bits-to-PAM Encoder

Bits-to-PAM encoder 100 encodes a group of B bits into a PAM symbol, K(n) (actually, a discrete voltage level pulse), where n represents a symbol index (the use of this notation, where n represents a symbol index, will prove particularly helpful following in that such notation allows tracking the progress of a single PAM symbol (or discrete voltage pulse) through the system. For a symbol-by-symbol based PAM encoder, M, the number of discrete PAM symbols, or voltage levels, is given by the relation $M=2^B$. Illustrated is that Bits-to-PAM encoder 100 outputs its symbols, K(n), to summing junction 102 of precoder 130. As an aside, the inventor points out that, for a frame-based PAM encoder, the encoder will take a frame (or multiple frames) of data bits and map them into multiple PAM symbols by means of multiple modulus conversion (as specified in V.90/V.92 standards) or shell mapping (as in V.34 spec); furthermore, the PAM encoder can also be used in conjunction with trellis-coded modulation (TCM) (as in V.92 and V.34). The invention is therefore useful with many other systems besides the V.90 and V.92, those being used only as one example of how the invention is incorporated into a communication system.

3. Precoder of FIG. 1 a. Overview of Precoder

Those having ordinary skill in the art will appreciate that transmitter precoding is complex, but known in the art. However, as an aid to understanding, the inventor provides the following overview. For more detailed background information, the inventor directs the reader to the following references: M. Tomlinson, *New-automatic Equalizer Employing Modulo Arithmetic*, 7 Electron Letter, March, 1971, at 138–139; H. Harashima & H. Miyakawa, *Matched-transmission Techniques for Channels with Intersymbol Interference*, COM-20 IEEE Trans. On Communications, August, 1972, at 774; and G. D. Forney, Jr. & M. V. Eyuboglu, *Combined Equalization and Coding Using Precoding*, 30 IEEE Comm. Magazine No. 12, December 1991, at 25–35.

By way of overview, those skilled in the art will recognize that a decision-feedback equalizer (DFE) is a nonlinear receiver structure that offers a good compromise between performance and implementation complexity (for more background information, please see J. G. Proakis, *Digital Communications*, $4^{th}$ Edition, McGraw-Hill Book Co., New York, 2001). One potential problem with the DFE is that any decision errors at the output of the decision device (slicer) will cause a corrupted estimate of the postcursor Inter-Symbol Interference (ISI) to be generated by the postcursor equalizer. This phenomenon is called error propagation.

Those skilled in the art will appreciate that DFE error propagation can be avoided by using transmitter precoding. There are several different variations of precoders (e.g., Forney, G. D., Jr. & Ungerboeck, G., *Modulation and coding for linear Gaussian channels*, 44 IEEE Transactions on Information Theory, October 1998 at 2384–2415), one of which is sometimes called a Tomlinson-Harashima precoder (THP), in honor of its co-inventors. See M. Tomlinson, *New-automatic Equalizer Employing Modulo Arithmetic*, 7 Electron Letter, March, 1971, at 138–139; see also H. Harashima & H. Miyakawa, *Matched-transmission Techniques for Channels with Intersymbol Interference*, COM-20 IEEE Trans. On Communications, August 1972, at 774.)

Those skilled in the art will appreciate that the idea of preceding is to move the cancellation of the postcursor ISI to the transmitter since the data symbols are available at the transmitter. Assume there is a feed-forward filter that produces a causal impulse response (only postcursor ISI) and this impulse response is known to the transmitter. In practice, this impulse response must be estimated in the receiver using adaptive filter techniques (e.g., such as those described in Proakis' *Digital Communications*), and passed back to the transmitter in order to use transmitter precoding. Those skilled in the art will appreciate that this is feasible on channels that are time-invariant or slowly time-varying.

A linear filter placed at the transmitter to invert the channel would be unstable if the channel has zeros in its transfer function, which when inverted, leads to unstable poles. A Tomlinson and Harashima precoder uses a nonlinear filter that can invert a causal impulse response, but which does not have the potential for error propagation or for unstable operation. The arrangement is shown in FIG. 1 where an equivalent channel with D-transfer function P(D) is equalized (precoded) at the transmitter.

A THP has the advantage that error propagation is eliminated and the noise at the receiver is not colored. Another virtue of placing a DFE capability at the transmitter is to eliminate the difficulties associated with combining the decoding the Trellis-coded modulation (TCM) which provides delayed decisions and conventional DFE which requires immediate decisions. See G. D. Forney, Jr. and M. V. Eyuboglu, "Combined Equalization and Coding Using Precoding," IEEE Comm. Magazine, Vol. 30, No. 12, pp. 25–35, December 1991.

Another advantage of the THP has to do with the statistics of the precoded symbols x(n). Under the continuous approximation and the assumption that the symbol alphabet M, is large, the x(n) are independent and uniformly distributed random variables. This implies that the statistics of the precoded symbols are very similar to the statistics of the original data symbols. This in turn implies that the spectrum of the x(n) is white. The inventor will show below that when M is finite and especially when the constellation levels are not uniformly spaced, the precoder output will be not be independent and therefore its spectrum will no longer white.

b. Operation of Precoder

Continuing to refer to FIG. 1, Precoder 130 includes summing junction 102, extended PAM constellation mapper c[m] 104, summing junction 106, precoder filter 108, and i(n) selection block 114. The operation of precoder 130 is somewhat complex, and the operations of its component parts are described in more detail below. However, as an aid to understanding, the inventor will first set forth a high level heuristic description of how the component parts of precoder 130 function together, prior to discussing such parts in detail.

As those skilled in the art will appreciate, insofar as precoder filter 108 is intended to supply the inverse transfer function of a channel with equivalent transfer function P(D), the magnitude of the output, w(n), of precoder filter 108 can be extremely large, dependent upon the characteristics of the transfer function of the channel, P(D), and the value of the precoded symbol x(n), and in some instances may be so large that the system becomes unstable if a regular (non-extended) PAM constellation mapper is used.

As can be seen from FIG. 1, the precoded symbol x(n) is the output of summing junction 106, and the inputs to summing junction 106 are u(n), the output of extended PAM constellation mapper 104 and the output w(n) of the precoder filter 108. In other words, $$x(n)=u(n)+w(n).$$

Continuing to refer to FIG. 1, and assuming that extended PAM constellation mapper 104 utilizes a mapping function C[m(n)]=2m(n)+1 (as an example), it follows that the output, u(n) of extended PAM constellation mapper 104 will be $$u(n)=2m(n)+1.$$

Continuing to refer to FIG. 1, it can be seen that the input, m(n), to extended PAM constellation mapper 104 is the output of summing junction 102. The inputs to summing junction 102 are K(n), the output of bits-to-PAM encoder 100 and the output i(n)M of multiplication junction 116. In other words, $$m(n)=K(n)+i(n)M,$$

and the output of the precoder, for c[m(n)]=2m(n)+1, is, $$\begin{aligned}x(n) &= w(n) + u(n)\\&= w(n) + 2m(n) + 1\\&= w(n) + 2K(n) + i(n)(2M) + 1\end{aligned}$$

For example, if M=8 (8-PAM), w(n)=102.25 and K(n)=5, then i(n) is selected so that |x(n)| is minimized, which yields i(n)=−7 and the precoder output becomes x(n)=102.25+2× 5+1+(−7)×2×8=1.25. It is straightforward to verify that with C[m]=2m+1 (uniformly spaced PAM, i.e., constellation levels ..., ±7, ±5, ±3, ±1) the precoder output is bounded, i.e., |x(n)|≦M.

Continuing to refer to FIG. 1, it can be seen that i(n) is the output of i(n) selection block 114. The value of i(n) is selected under a certain defined design criterion (normally minimizing symbol-by-symbol output power of the precoder, i.e., [x(n)]$^2$ or simply |x(n)|) and −N≦i(n)<N where we assume there are N positive constellation levels and N negative levels. In other words, the value of i(n) is selected such that under a certain defined modulo arithmetic scheme the output, of extended PAM constellation mapper 104 will substantially be the smallest number, under the defined modulo scheme, that is representative of K(n). If the minimum symbol-by-symbol precoder output power is the ultimate goal, then selecting i(n) is equivalent to performing a modulo M operation on (w(n)+2K(n)+1) if C[m]=2m+1 is used (A modulo scheme is often explained by reference to counting on a 12 hour rotary clock face (which is representative of a modulo 12 scheme); for example, in module 12 the number 17 is represented by 5 (e.g., 17−12=5), the number 29 is represented by 5 (e.g., 29−2(12)=5), and the number 41 is represented by 5 (e.g., 41−3(12)=5), where the resultant modulo numbers can all be obtained by counting to the number of a 12 hour rotary clock face.) Thus, if you choose your modulo scheme sufficient to provide for all your likely symbol values, you can substantially eliminate your likelihood of making the system become unstable by keeping the magnitude of the value of x(n) bounded, so that even if the output, w(n), of precoder filter 108 is large, x(n), which is the sum of u(n) and w(n), can be kept bounded by ±M.

Continuing to refer to FIG. 1 and when a non-equally spaced constellation is used and/or a different design criterion is imposed other than minimizing the precoder output power, the i(n) selecting procedure in general will not be a simple modulo M operation but the original rule will still apply, i.e., selecting i(n) such that a certain design criterion is met or a cost function is minimized.

The foregoing constitutes a high level heuristic description of precoder 130. For a more detailed discussion, the reader is referred to the references described above. Each of the component parts of precoder 130 will now be discussed in more detail.

i. Extended PAM Constellation Mapper of Precoder

Shown is that summing junction 102 outputs its symbols, m(n), to extended PAM constellation mapper C[m] 104. Depicted is that extended PAM constellation mapper C[m] 104 outputs its symbols, u(n), to summing junction 106.

Insofar as that the operation of extended PAM constellation mapper C[m] 104 has been discussed above in relation to the inventor-discovered problems with the V.92 PAM scheme, a detailed description of its operation is not set forth here.

ii. Precoder Filter of Precoder

The present detailed description assumes a level of skill in the art encompassing modems, modem standards, numerical methods, statistics, digital signal processing, and digital filtering. The inventor points out that while the input data bit stream, {b(j)}, is in fact a digital stream, and the subsequent mappings by the PAM constellation mappers are to discrete voltage levels, the digital filters shown and described herein, although digital, are not performing operations related to the digital, or discrete, nature of the PAM data. That is, although the PAM systems described herein produce discrete square pulses, the digital filters and spectrum shapers described herein are not filtering on the digital content produced by the pulse amplitude modulators, but instead are filtering and shaping on the frequency components making up the discrete square pulses. In addition, the inventor also points out that the operation of digital filters cannot generally be understood or reasoned out by sketching the behavior of such filters in the time domain, in that each digital filter is usually the result of at least one inverse mathematical transform of desired frequency domain characteristics, plus some empirical engineering work. For background information on digital filters and digital signal processing (DSP) in general, please see C. Bore, An Introduction to the Principles and Practise of Digital Signal Processing (2002); C. Bore, An Introduction to the Principles and Practise of FIR Digital Filters (2002); and C. Bore, An Introduction to the Principles and Practise of IIR Digital Filters (2002), all of which are available for purchase as eBooks at http://www.bores.com.

Illustrated is that precoder filter 108 outputs each symbol, w(n), to summing junction 106. Precoder filter 108 is typically used in a transmitting station to pre-compensate for analog channel (amplitude and phase) distortion that will be experienced by signals as they propagate from the transmitting station to the receiving station. Precoder filter 108's functionality is similar to that of decision-feedback equalization residing at a receiving station but with two distinct advantages: (a) no-error propagation; and (b) it can be used with TCM. Those having ordinary skill in the art will appreciate that, typically, the coefficients of precoder filter 108 are acquired in the receiving station and transferred back to the transmitting station. In a strictly zero-forcing approach, the precoder coefficients are chosen to satisfy P(D)=F(D)C(D) (in D-transform) where C(D) is the analog channel response and F(D) is any combined filter response besides C(D). For proper operation, P(D): should be monic, i.e., the center tap should be one. Furthermore, for most channels of interest, P(D) is forced to be causal and monic, i.e., the first tap of P(D) is set to one.

iii. i(n) Selection Block of Precoder

Returning attention now again to summing junction 106, shown is that summing junction 106 outputs its resultant signal, x(n), which is fed back through i(n) selection block 114, which uses an algorithm to choose a number i(n) such that, when K(n) is summed with i(n)M, and such sum subsequently run through extended PAM constellation mapper C[m] 104, the output u(n) will subsequently generate a sequence of the precoder output x(n) that meet or is close to a predefined design criterion (or cost function). If the minimum power criterion is used, u(n) will fold w(n) toward the smallest magnitude that is equivalent to x(n) under the predefined modulo scheme in use. Specifically, in one embodiment, i(n) selection block 114 selects i(n) to minimize x(n). The chosen i(n) and M enter multiplication block 116, whose output is then input to summing junction 102.

4. Prefilter of FIG. 1 a. Overview of Prefilter

Those having ordinary skill in the art will appreciate that prefilter 110 is particularly useful when feed-forward equalization is not feasible at a receiving station (e.g., such as in V.92 upstream). It is not required in all embodiments and need not be present. Those skilled in the art will appreciate that, if a feed-forward equalizer (FFE) can be placed at the receiver, one would preferably use a FFE in the receiver instead of a pre-filter in the transmitting station.

b. Operation of Prefilter

Continuing to refer to FIG. 1, shown is an embodiment in which the summing junction 106 outputs its resultant symbol, x(n), to prefilter 110. Preferably, prefilter 110 has filter coefficients chosen to produce filter response, F(D), sufficient to adequately compensate for channel phase distortion when used in conjunction with precoder filter 108.

Prefilter 110 outputs its filtered symbol, z(n) to analog channel 112, which is a mathematical model of the physical characteristics of interest of the medium spanning the transmitting station and the receiving station. Those having ordinary skill in the art will appreciate that, typically, the channel of interest is modeled as a linear channel with response C(D). Further depicted is the injection of v(n), a mathematical model of additive noise.

C. Inventor has Discovered that Precoding Systems Using Non-Equispaced PAM Undesirably Color the Transmit Power Spectrum As noted previously, in devising the V.92 standard, the standard designers made what superficially appeared to be minor changes to the previously-existing operation of the PAM system, but these changes have been found by the inventor to adversely affect system performance.

Again, the V.92 standard is just one example where the invention is useful, and other communication systems may also make use of the invention as will be apparent to a person skilled in the art, including but not limited to all communications systems that use precoding, such as SHDSL (Symmetric High-Bitrate Digital Subscriber Loop) of the ITU 991.2 specification.

Continuing to refer to FIG. 1, depicted is that precoder filter 108 calculates filter output as $$w(n) = \sum_{k=1}^{L} x(n-k) p(k)$$

where we assume P(D) is a finite impulse response (FIR) filter (w/length of L) without loss of generality. The precoder output, x(n), is formed as:

$$x(n) = u(n) + w(n) = u(n) + \sum_{k=1}^{L} x(n-k) p(k)$$

where u(n) is the output of the extended constellation mapper, u(n)=C[m(n)] and m(n) is given as m(n)=i(n)M+K(n) where K(n) is the output of the PAM encoder. The integer multiplier i(n) is selected such that |x(n)| or the instant (symbol-by-symbol) power of x(n) is minimized.

The inventor points out that a conventional (e.g. uniformly spaced) PAM system uses equispaced PAM. For example, a system that takes {±1, ±3, . . . } as its PAM voltage levels, and uses an extended PAM constellation mapping function of C[m]=2m+1 that can be accomplished by a simple modulo M operation. In contrast, the inventor points out that the V.92 PAM system (representative of systems using non-uniformly spaced PAM) specifies non-uniformly spaced PAM, and the extended PAM constellation mapper is either a listed table with a finite number of levels or an explicit function of a mapping index, e.g. C[m]=ƒ(m) following A-law or μ-law rules.

1. When V.92 Architecture Uses Non-Uniformly Spaced PAM, the Transmit Power Spectrum is Highly Colored As noted above, in devising the V.92 standard, the designers made what superficially appeared to be minor changes to the previously-existing operation of the PAM system. Namely, that the extended PAM constellation mapper C[m] 104 would use non-uniformly spaced PAM, the V.92 standard system. However, the inventor has unexpectedly discovered that if such a change is made, the V.92 standard system will not always function substantially similarly to conventional (e.g. uniformly spaced) PAM systems.

The inventor points out that the conventional PAM systems dictate that extended PAM constellation mapper C[m] 104 use uniformly spaced PAM. The reason for this is that for uniformly spaced PAM and C[m]=2m+1, the precoding procedure will be constructed sufficient to ensure that |x(n)| ≦M by selecting proper i(n). It has been found empirically that, with M large and a severely distorted channel, the distribution (statistical) of x(n) is almost uniformly distributed over [−M, M] and hence its frequency spectrum tends to be white.

The inventor points out that in the V.92 standard, the optimum extended PAM constellation mapper C[m] 104 uses non-uniformly spaced PAM constellation points that tend to match the underlying central office (CO) codec quantization grids. The inventor has determined that the use of non-uniformly spaced PAM results in degradation of communication system performance.

Figure 2:
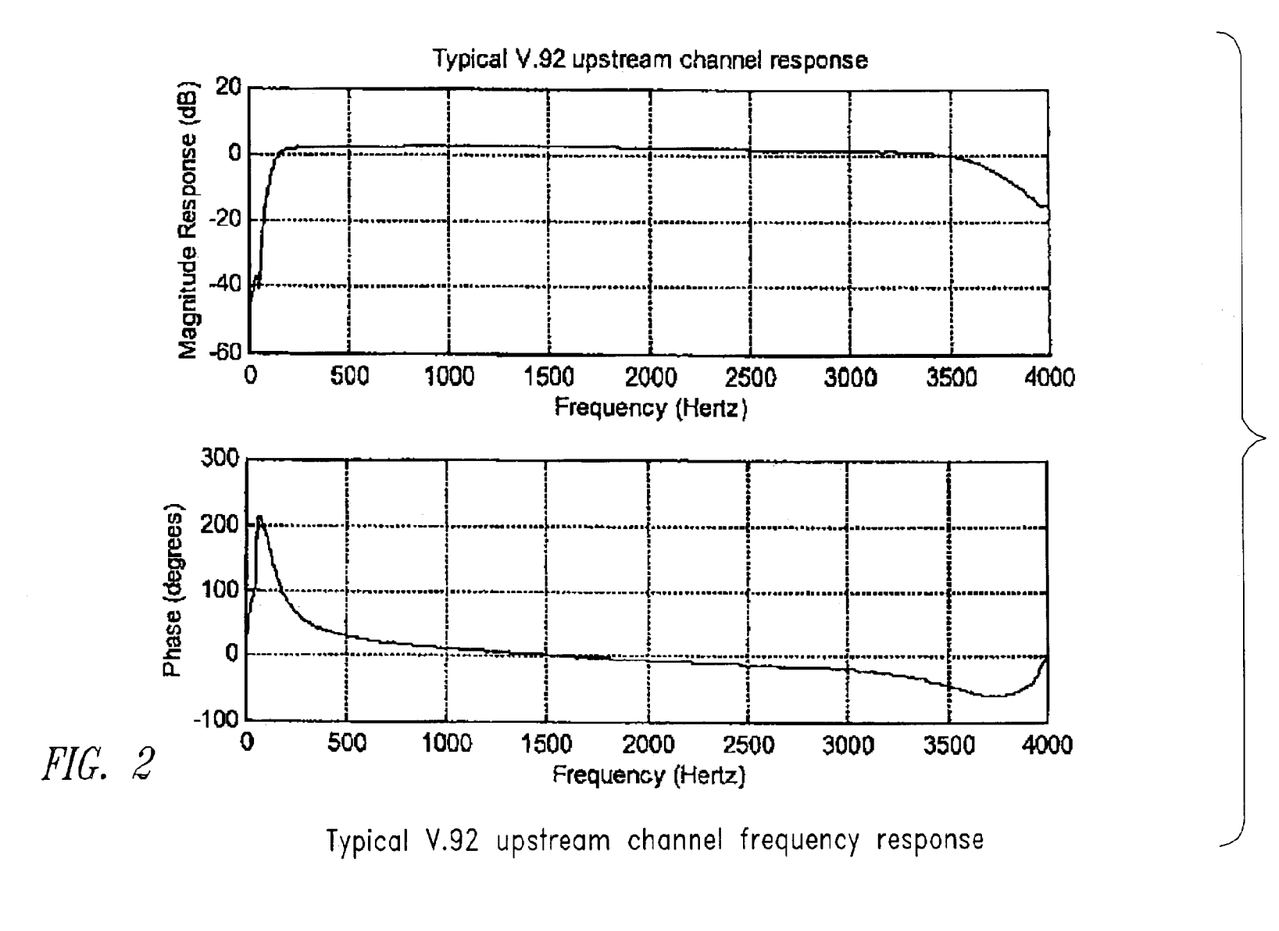
FIG. 2 depicts a typical V.92 upstream channel response of a simulated system
Figure 3:
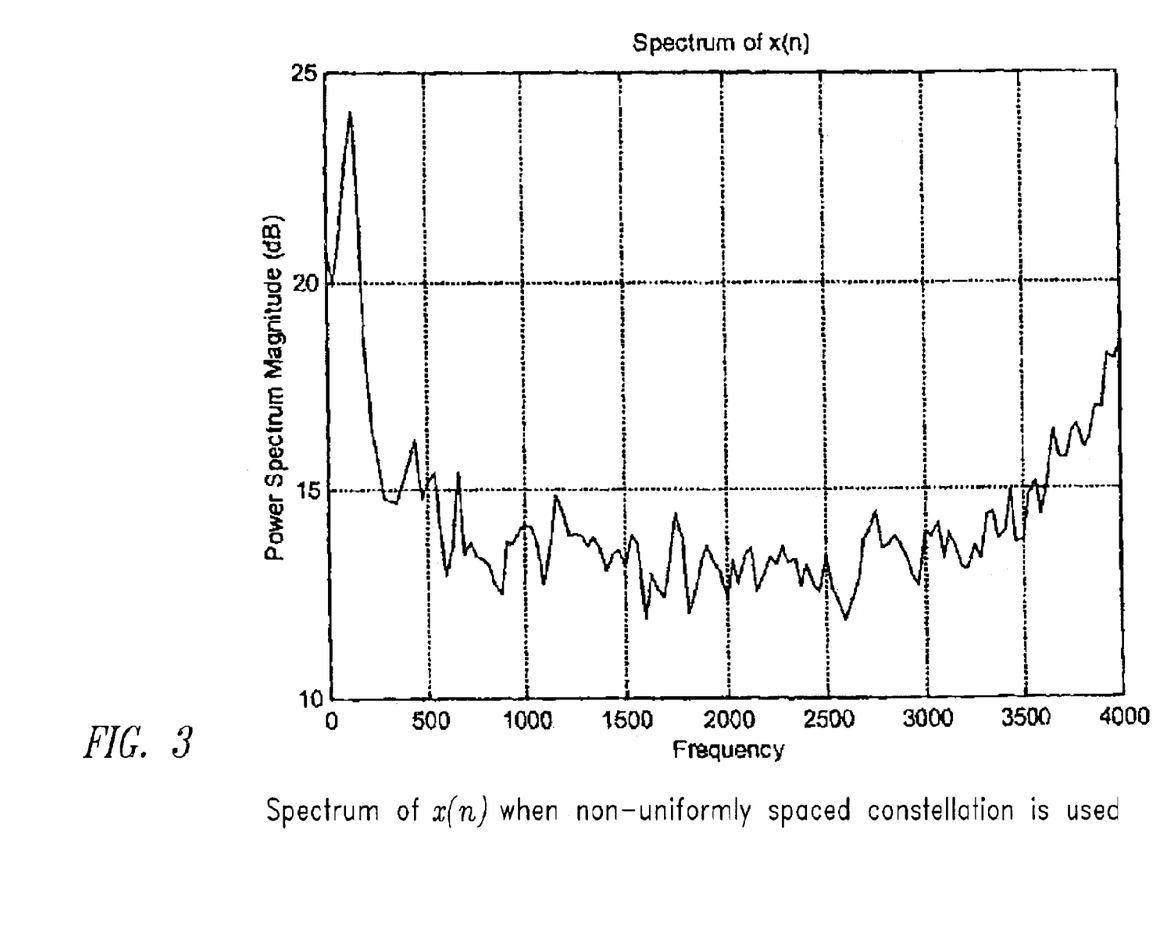
FIG. 3 illustrates, that, for a simulated system having noted simulation parameters, the power spectrum of a precoded signal x(n) has become highly colored.

As an illustrative example, the inventor essentially utilized the V.92 communications system architecture, as described above, and considered a non-uniformly spaced PAM where C[m]=sign(m)+(1+m)|m| for all −N≦m<N with N being the maximum size of the extended constellation, and simulated the system on MATLAB, the results of which are shown in FIGS. 2 and 3 and described herein.

Referring now to FIG. 2, depicted is a typical V.92 upstream channel response (e.g., as would appear if a PAM symbol, or square pulse, appeared at the output of precoder filter 108 of FIG. 1) of a simulated system having the foregoing-noted simulation parameters. As can be seen, the magnitude of the upstream channel response is substantially flat across the frequencies shown. As can also be seen, the frequency response has a spike between zero and five hundred hertz.

With reference now to FIG. 3, illustrated is that, for the simulated system having the foregoing-noted simulation parameters, the power spectrum of the precoded signal x(n) has become highly colored. The inventor has found that this undesirable coloring results when the non-uniformly spaced constellation levels of the V.92 standard are used. In particular, the inventor has found that the 10 dB spectral spike around 120 Hz can cause numerous problems at the receiving station. The inventor notes that a smooth spectrum is usually desired for normal communications operation.

D. Inventor has Discovered that Precoding System Operation can be Combined with Spectral Shaping As noted above, the inventor has discovered that the use of non-uniformly spaced PAM in V.92 systems results in undesirable coloring of the signal power spectrum of the precoded symbols, x(n). The inventor has determined that it is advantageous to reduce such undesirable coloring of x(n) due to the non-equally spaced constellation that is required in V.92.

As a related problem, it is desired in some applications that a certain spectral shape is required to ensure proper operation. For example, many baseband systems use transformer coupling or AC-coupled electronics, which implies that the channel has infinite loss at DC Therefore, a transmit spectrum with DC notched is highly desirable for this channel.

Spectral nulls can be inserted at one frequency or finite set of frequencies using a filter in the transmitter. Transmit filtering often has the undesired side effect of increasing peak transmitted power. Also, a fully equalized receiver will try to compensate signal loss at frequencies where spectral nulls are introduced. Therefore, transmitter precoding should be used in conjunction with spectral shaping, or line coding can be used to achieve the same goal.

1. Modifying Precoding Architecture to Obtain Desired Spectrum

As noted above, the inventor has determined that it is highly desirable that the transmit power spectrum of the individual symbols, x(n), emerging from the output of precoder 130, be approximately white under the continuous approximation (M is large) and the assumption that constellation is evenly spaced. In one implementation, the invention ensures that the transmit power spectrum of the individual symbols, x(n), emerging from the output of precoder 130, be approximately white by treating the coloring as "unwanted signal components," and adjusting the architecture so that such "unwanted signal components" are minimized.

Specifically, as set forth above, the inventor has determined that the use of non-uniformly spaced PAM constellation results in the transmit power spectrum of the individual symbols, x(n), emerging from the output of precoder 130, having one or more power spikes at various frequencies. The inventor is also aware that the "cost function" of the precoding architecture can be adjusted such that it tends to minimize what are defined to be unwanted signal components as well as transmit power. With reference again to the precoding architecture of FIG. 1, selecting i(n) is done such that a cost function defined as below is minimized, $$J(n) = \alpha \,|x(n)|^2 + (1-\alpha)\left|\sum_{k=0}^{n} x(k)\right|^2$$

where $0 \leq \alpha \leq$ is a constant. If $\alpha=1$, the cost function will reduce to that of the conventional precoder. A similar but not completely identical cost function can be used to achieve the same goal, $$J(n) = \alpha \,|x(n)| + (1-\alpha)\left|\sum_{k=0}^{n} x(k)\right|.$$

As used herein, a term $$RDS(n) = \sum_{k=0}^{n} x(k)$$

is called the running digital sum of the precoded signal x(n) and the RDS can be utilized to measure how much DC or low frequency components are in x(n). The RDS is a useful property of the DC notching because it predicts accurately the magnitude of the baseline wander ISI for a low cutoff frequency. When the RDS is bounded, there is a spectral null at DC. The above cost function ensures that the RDS is small and the output power of the precoder is also small. The design parameter $0 \leq \alpha \leq 1$ can be used to balance performance between DC notching (minimum DC power) and spectral whitening (minimum total power).

In a further embodiment of the subject matter of the present application, the cost function can be combined with any other design rules. For example, this further embodiment allows to replace or to add cost functions to the above formula such as the running filter sum (RFS) described in a series of patents, including U.S. Pat. No. 5,970,100 (issued Oct. 9, 1999), U.S. Pat. No. 6,192,087 (issued Feb, 20, 2001) and U.S. Pat. No. 6,278,744 (issued Aug. 21, 2001) all to Sverrir Olafsson, Zhenyu Zhou and Xuming Zhang.

Specifically, the inventor has noted that insofar as the frequencies associated with the one or more transmit power spectrum spikes (or colorings) are known, such spikes can be defined as "unwanted signal components," and the parameters of the precoder architecture adjusted accordingly so that such unwanted spike components (or colorings) are suppressed. The inventor points out that the cost function is function of various parameters, and that the system designer can choose the parameters to optimize the cost (like adaptive filtering) utilizing optimization procedures well known to those having ordinary skill in the art (e.g., adaptive solutions).

Figure 5:
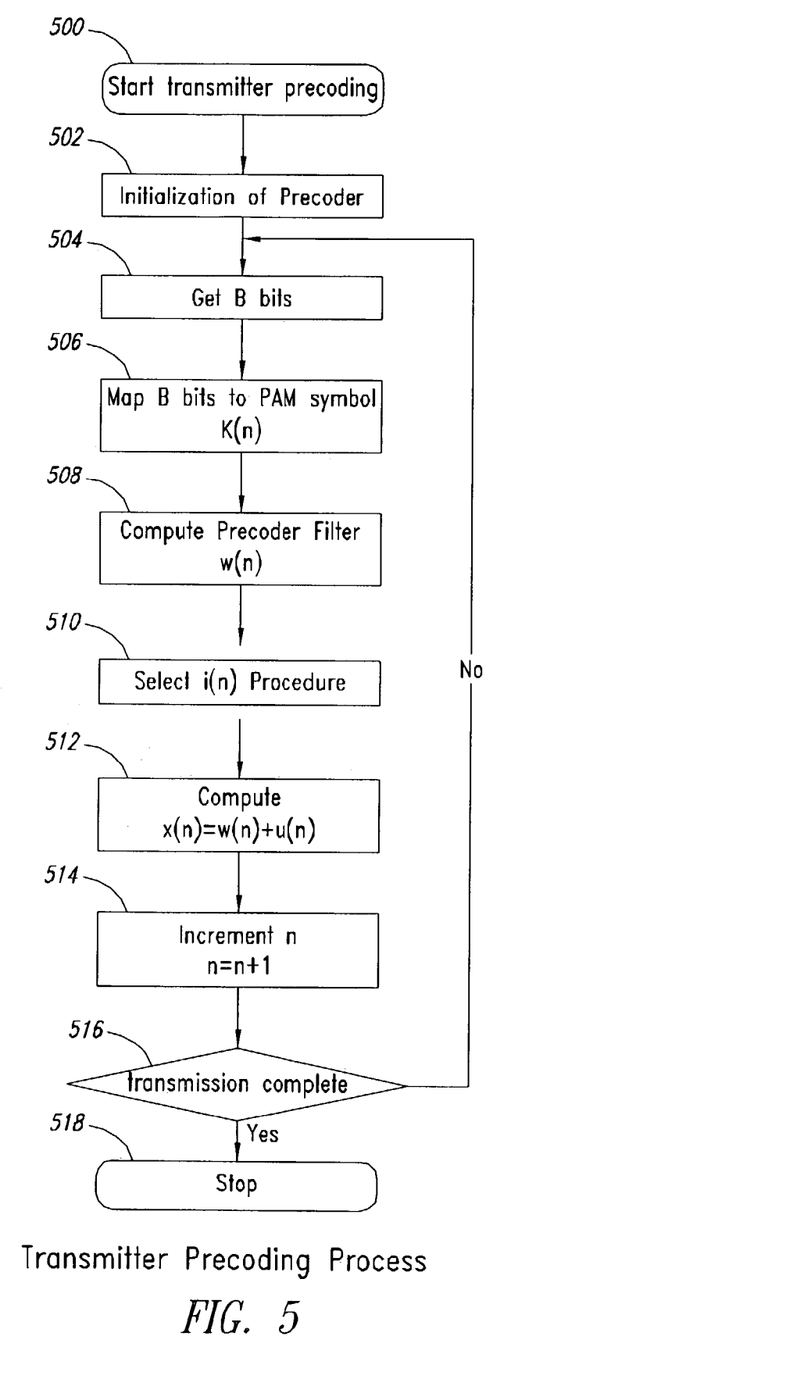
FIG. 5 depicts a high-level block process flow chart showing a transmitter precoding scheme according to the subject matter of the present application.

FIG. 5 depicts a high-level block process flow chart showing the transmitter preceding scheme according to the subject matter of the present application. Method step 500 shows the start of the process. Method step 502 depicts the operation of the initialization of a precoder (e.g., initialization of precoder 130). Method step 504 illustrates the operation of receiving B bits (e.g. bits-to-PAM encoder 100 receiving a series of bits).

Method step 506 shows the operation of mapping B bits to PAM symbol K(n) (e.g., bits-to-PAM encoder 100 outputting a symbol K(n) equivalent to the received B bits referenced in method step 504). Method step 508 depicts the operation of computing the output w(n) of the precoder filter (e.g., the output of precoder filter 108).

Method step 510 illustrates the operation of engaging in the select i(n) procedure (e.g., as has herein described in relation to i(n) selection block 114). Method step 512 shows the operation of computing x(n)=w(n)+u(n) (e.g., as herein described in relation to the overall operation of precoder 130).

Method step 514 depicts the operation of incrementing n, the symbol index (e.g., as herein described in relation to the bits-to-PAM encoder 100). Method step 516 illustrates an inquiry as to whether transmission is complete. In the event that the inquiry of method step 516 yields a determination that transmission is not complete, shown is that the process proceeds to method step 504 and continues as has been described herein. In the event that the inquiry of method step 516 yields a determination that transmission has been completed, shown is that the process proceeds to method step 518, which depicts the end of the process.

Figure 6:
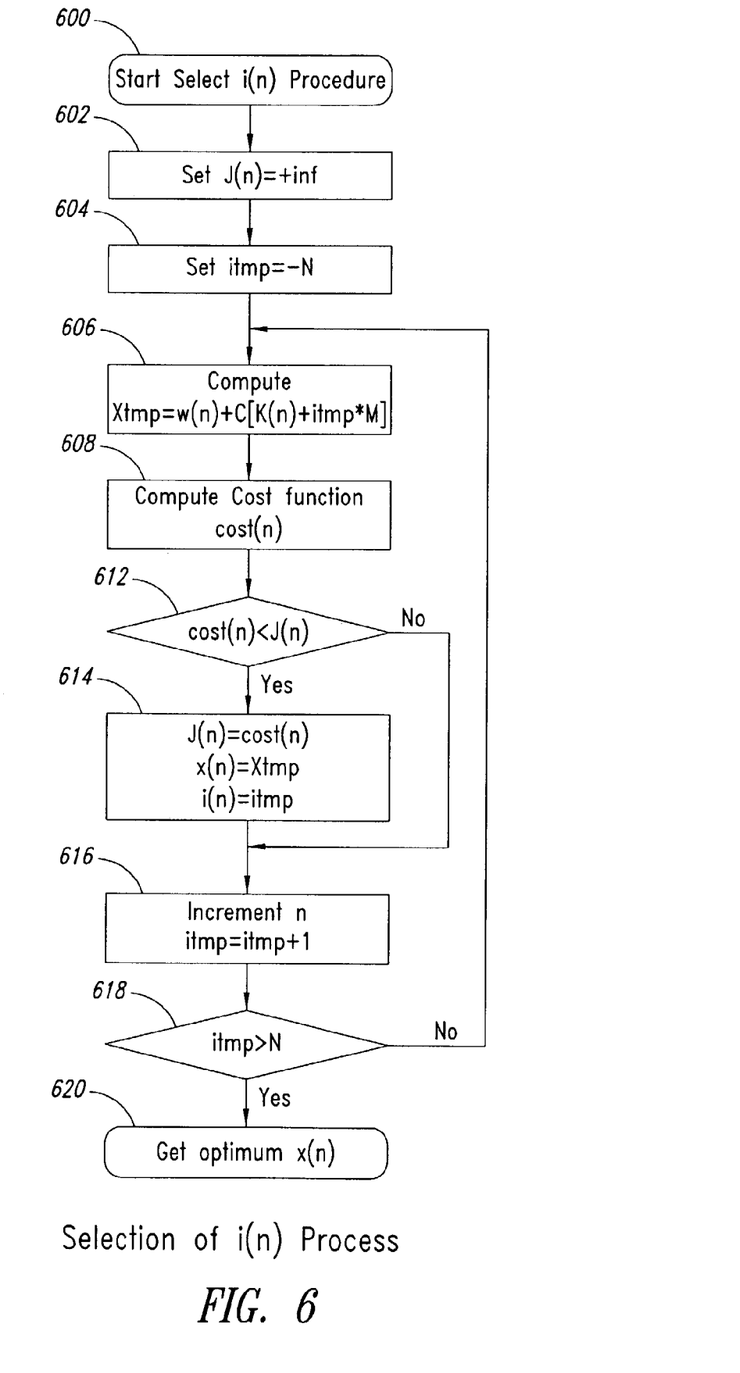
FIG. 6 illustrates one possible approach to find the optimum i(n) according to a given cost function.

FIG. 6 shows one possible approach to find the optimum i(n) according to a given cost function. Method step 600 shows the start of the process. Method step 602 depicts the operation of setting J(n)=+inf. Method step 604 illustrates the operation setting itmp=−N.

Method step 606 shows the operation of computing Xtmp=w(n)+C[K(n)+itmp*M]. Method step 608 depicts the operation of computing the cost function cost(n).

Method step 612 illustrates an inquiry as to whether cost(n)<J(n). In the event that the inquiry of method step 612 yields a determination that cost(n) is less than J(n), the process proceeds to method step 614, which depicts setting J(n)=cost(n), x(n)=Xtmp, and i(n)=itmp. In the event that the inquiry of method step 612 yields a determination that cost(n) is not less than J(n), the process proceeds to method step 616, which shows the operation of incrementing the symbol index n, and setting itmp=itmp+1.

Method step 618 illustrates an inquiry as to whether itmp>N. In the event that the inquiry of method step 618 yields a determination that itmp is greater than N, the process proceeds to method step 620, which depicts obtaining the optimum x(n). In the event that the inquiry of method step 618 yields a determination itmp is not greater than N, the process proceeds to method step 606, and continues in the fashion described previously.

With respect to the above-mentioned cost function, when the above-mentioned cost function is used, then the cost function is calculated as follows: (1) compute the running digital sum using the recursive form RDS(n)=RDS(n−1)+x(n); (2) compute temporary cost function as cost(n) $=\alpha|Xtmp|^2+(1-\alpha)|RSD(n-1)+Xtmp|^2$. After the optimum i(n) is found, the RDS is updated as RDS(n)=RDS(n−1)+x(n).

2. Inserting A Spectral Shaper Into a Precoding Architecture

As noted above, the inventor has determined that it is highly desirable that the transmit power spectrum of the individual symbols, x(n), emerging from the output of precoder 130, be approximately white. In one implementation, the inventor ensures that the transmit power spectrum of the individual symbols, x(n), emerging from the output of precoder 130, be approximately white by treating the coloring as "unwanted signal components," and adjusting the precoder architecture so that such "unwanted signal components" are minimized.

One way in which the inventor has achieved the foregoing is to insert a spectral shaper S(D) into the precoder architecture. If the channel is ideal, a Tomlinson precoder can be designed for the "channel" response S(D) (actually a part of the transmitter). If the channel has a non-ideal response P(D), where P(D) is monic and causal, then the precoder can be designed for the "channel" response P(D)S(D), which is also monic and causal.

Figure 4:
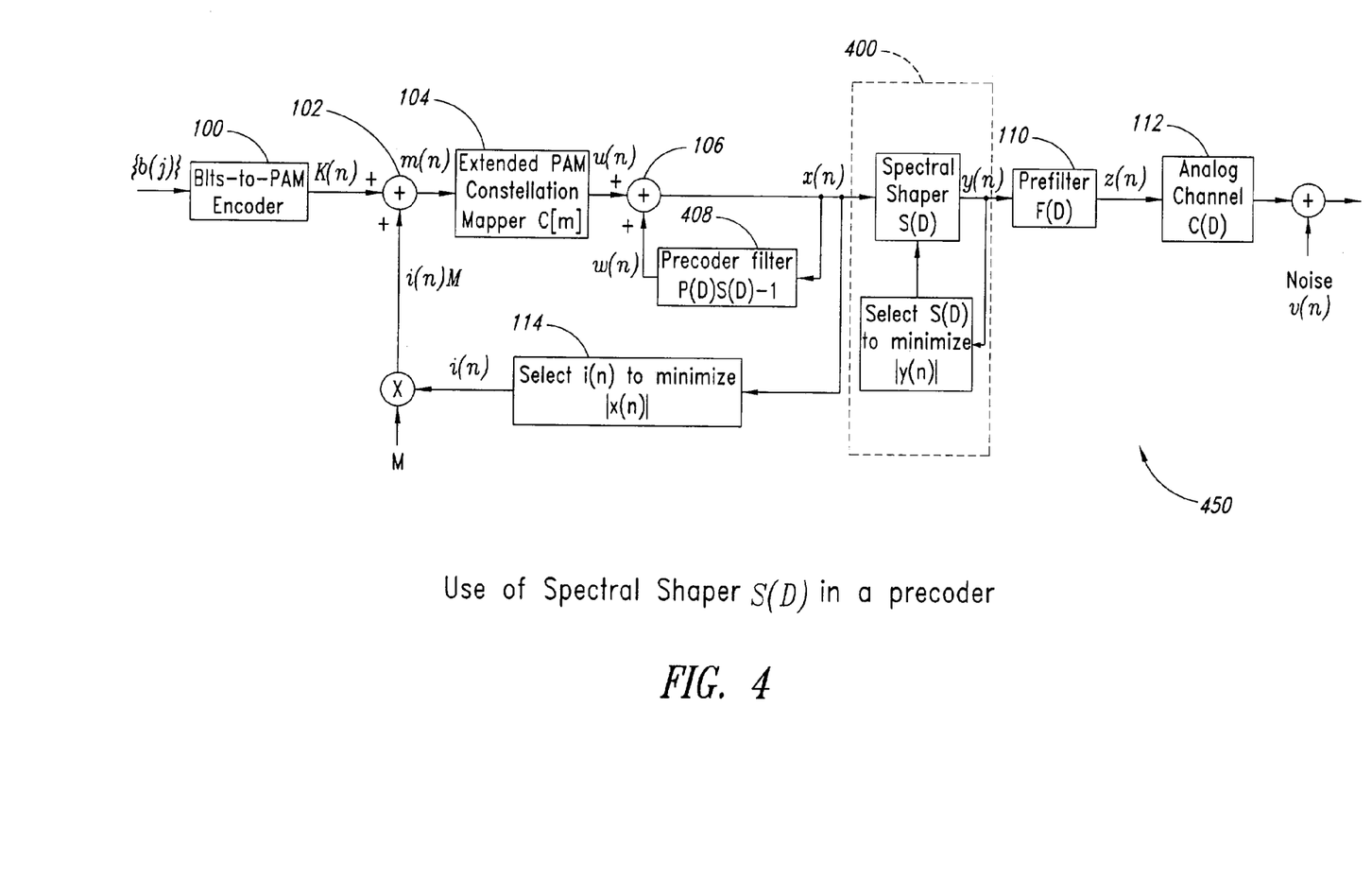
FIG. 4 shows precoding architecture 450, which provides spectral shaping or additional spectral whitening.

Referring now to FIG. 4, components provide spectral shaping or additional spectral whitening. The architecture depicted in FIG. 4 is similar to that shown and described in relation to FIG. 1, except that in FIG. 4 the precoder system has been modified to include the presence of a spectral shaper to ensure that the transmit power spectrum of the symbol, y(n), emerging from spectral shaper system 400 will appear substantially "white," while simultaneously ensuring that the presence of the spectral shaper does not disrupt the operation of the other system components.

Specifically, shown in architecture 450 is a spectral shaper system 400 having spectral response S(D). Precoder filter 108, having filter response P(D), of FIG. 1 has been modified to produce precoder filter 408 which is such that the presence of the spectral shaper system 400 is essentially cancelled out from the resultant signal.

As can be seen in FIG. 4, this process will be transparent to the remote receiver since the process does not change underlying channel response, in that the effects of the spectral response, S(D), in the direct transmit path and one in the precoder feedback path cancel out each other as long as S(D) is invertible (i.e., no spectral nulls). For convenience, one may select $$S(D) = 1 + \sum_{i=1}^{L_s} s_i D^i,$$

or use the vector $s(n)=[s_1(n),s_2(n), \ldots, s_{L_s}(n)]$ to represent the spectral shaper.

Figure 7:
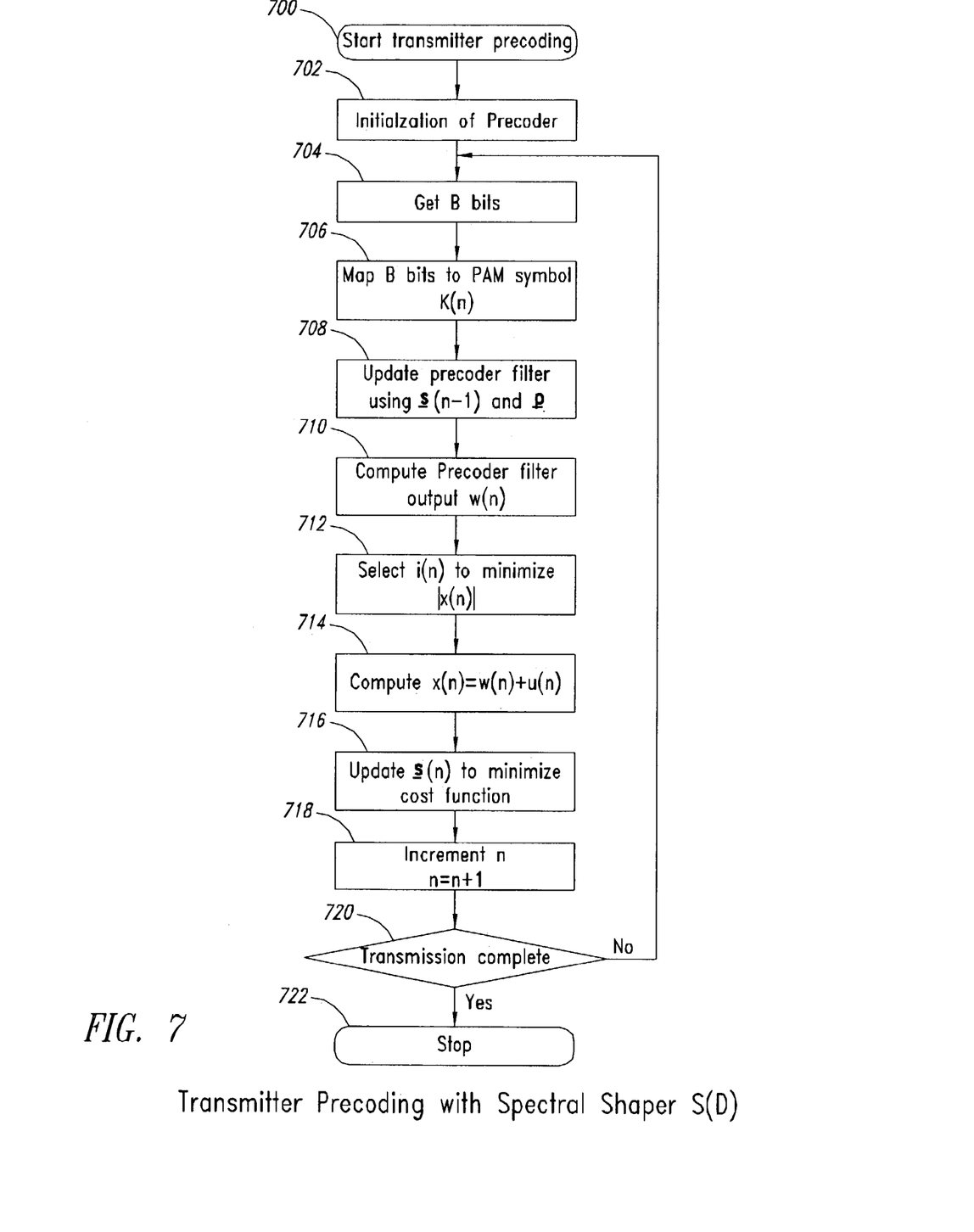
FIG. 7 shows a high-level logic flow chart of an implementation of transmitter precoding spectral shaper S(D).

FIG. 7 shows a high-level logic flow chart of an implementation of transmitter precoding spectral shaper S(D) according to the system of FIG. 4. Method step 700 shows the start of the process. Method step 702 shows the operation of the initialization of a precoder (e.g., initialization of precoder 130). Method step 704 illustrates the operation of receiving B bits (e.g. bits-to-PAM encoder 100 receiving a series of bits).

Method step 706 shows the operation of mapping B bits to PAM symbol K(n) (e.g., bits-to-PAM encoder 100 outputting a symbol K(n) equivalent to the received B bits referenced in method step 504). Method step 708 depicts the operation of the updating a precoder filter using s(n−1) and p where s(n−1) represents the spectral shaper, and p represents the vector of the precoder coefficients. Method step 710 illustrates the operation of computing precoder filter output w(n).

Method step 712 shows the operation of selecting i(n) to minimize |x(n)|. Method step 714 depicts the operation of computing x(n)=w(n)+u(n). Method step 716 illustrates the operation of updating s(n) to minimize the cost function. Method step 718 shows the operation of the incrementing n via the relationship of n=n+1. Method step 720 depicts an inquiry as to whether transmission is complete. In the event that the inquiry of method step 720 yields a determination that transmission is not complete, the process proceeds to method step 704 and continues as has been described herein. In the event that the inquiry of method step 720 yields a determination that transmission has been completed, the process proceeds to method step 722, which depicts the end of the process.

After the spectral shaper s(n) is updated, the corresponding $(L+L_s-1)$-tap precoder coefficients can be recalculated as follows, $$q(n)=[p,0]+[s(n),0]+[0,ps(n)]$$

where $p=[p_1,p_2, \ldots, p_L]$ is the vector of the original precoder coefficients, 0 represents any zero vectors for filling vectors p and s(n) up to the full length $(L+L_s-1)$ and the operator represents vector convolution. Or equivalently, $$Q(D) = 1 + \sum_{i=1}^{L+L_s-1} q_i D^i = S(D)P(D).$$

The inventor points out that a special case of the foregoing general scheme may be understood as follows (as will be explained with respect to FIG. 8, described in detail following). The inventor points out that, in one implementation, the spectral response, S(D), can be selected or adaptively updated according to a variety of criteria. For spectral whitening purposes, one may select S(D) such that |y(n)| is minimized. Then S(D) will be a forward linear predictor and can be adapted by using the LMS algorithm as follows:

$$s_i(n)=s_i(n-1)-\mu y(n)x(n \times i), i=1, 2, \ldots, L_s$$

where μ is the step size.

Figure 8:
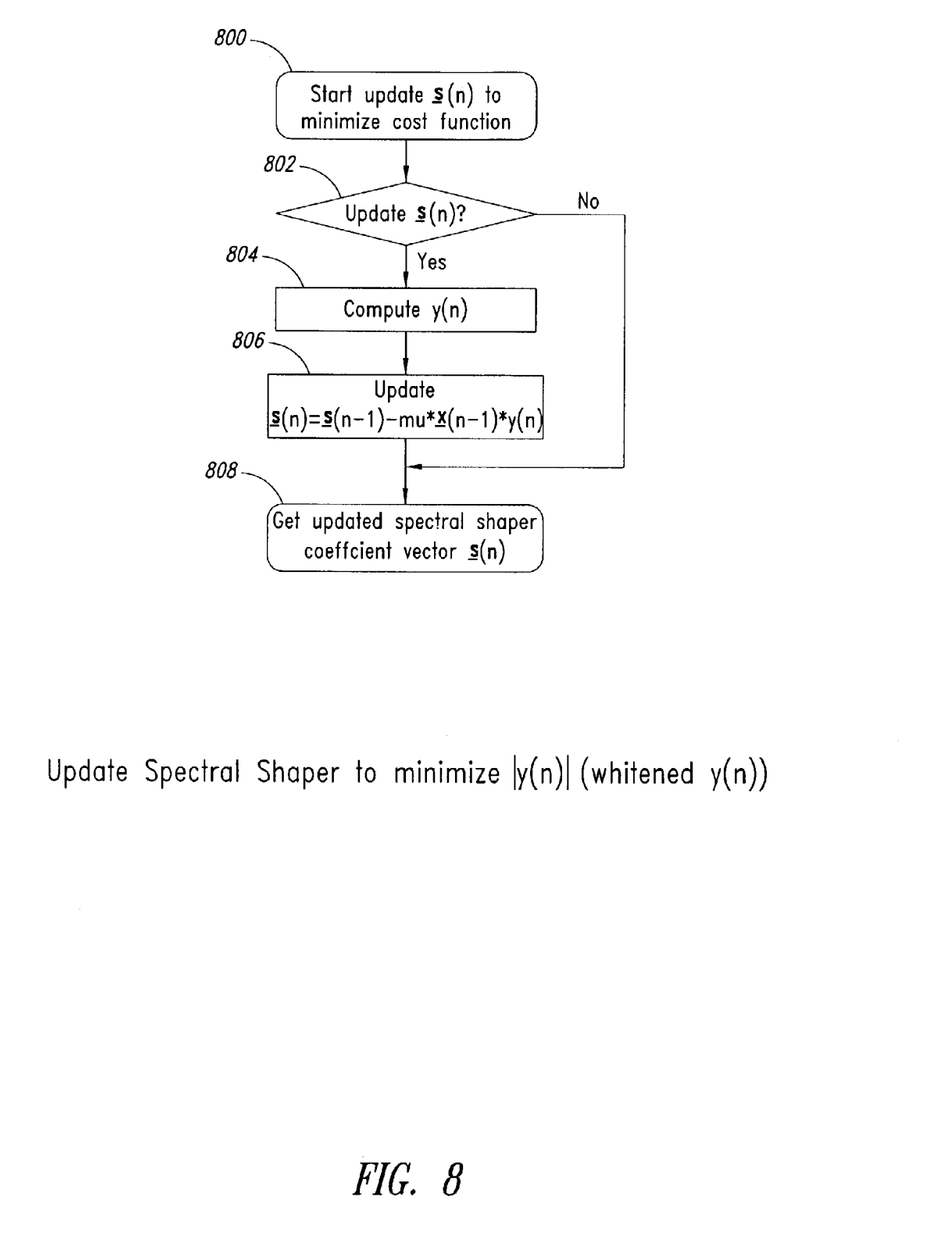
FIG. 8 depicts a high-level logic flow chart of an implementation of updating a spectral shaper to minimize |y(n)| (whitening).

FIG. 8 depicts a high-level logic flow chart of an implementation of updating a spectral shaper to minimize |y(n)| (whitening). Method step 800 shows the start of the process of updating s(n) to minimize the cost function. Method step 802 depicts an inquiry as to whether updating s(n) is desired. In the event that the inquiry of method step 802 yields a determination that updating s(n) is not desired, shown is that the process proceeds to method step 808 and continues as described herein. In the event that the inquiry of method step 802 yields a determination that updating s(n) is necessary, shown is that the process proceeds to method step 804, which depicts computing y(n).

Method step 806 shows the operation of updating s(n)=s(n−1)−mu*x(n−1)*y(n). Method step 708 depicts the operation of updating a precoder filter using s(n−1) and p. Method step 808 illustrates the operation of obtaining updated spectral shaper coefficient vector s(n).

Figure 9:
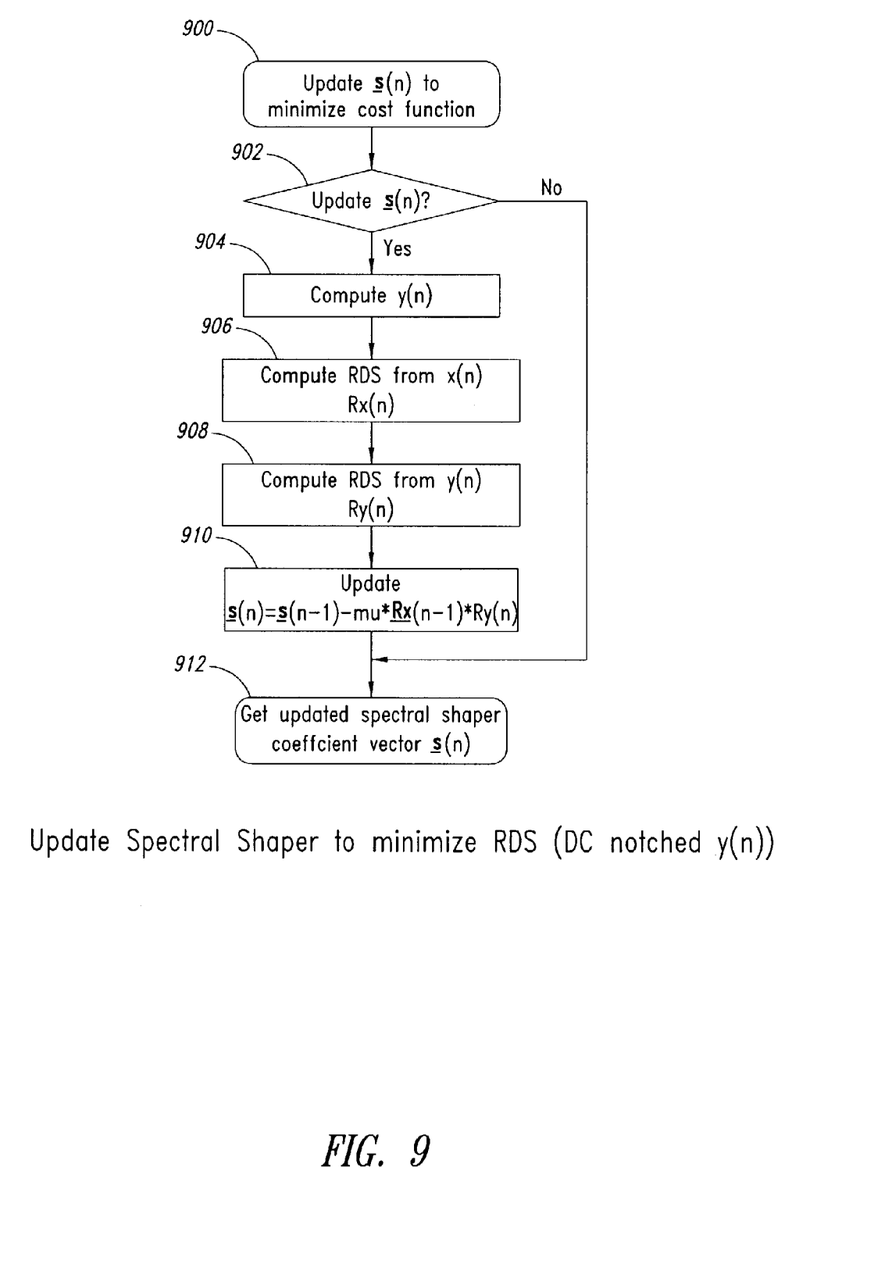
FIG. 9 illustrates a high-level logic flow chart of an implementation of updating a spectral shaper to minimize RDS (DC notching).

For spectral shaping or DC/low frequency component removal, one can choose S(D) to minimize the RDS of y(n). The LMS adaptation rule will be changed to (e.g., see FIG. 9 described in detail following):

$$s_i(n)=s_i(n-1)-\mu R_y(n)R_x(n-i), i=1, 2, \ldots, L_s$$

where $$R_y(n) = \sum_{k=0}^{n} y(k) \text{ and } R_x(n) = \sum_{k=0}^{n} x(k)$$

are the running digital sums of y(n) and x(n), respectively.

FIG. 9 depicts a high-level logic flow chart of an implementation of updating a spectral shaper to minimize RDS (DC notching). Method step 900 shows the start of the process of updating s(n) to minimize the cost function. Method step 902 depicts an inquiry as to whether updating s(n) is desired. In the event that the inquiry of method step 902 yields a determination that updating s(n) is not desired, shown is that the process proceeds to method step 912 and continues as described herein. In the event that the inquiry of method step 902 yields a determination that updating s(n) is desired, the process proceeds to method step 904, which depicts computing y(n).

Method step 906 shows the operation of computing RDS, Rx(n), from x(n). Method step 908 depicts the operation of computing RDS, Ry(n), from y(n). Method step 910 illustrates the operation of updating s(n)=s(n−1)−mu*Rx(n−1)*Ry(n). Method step 912 shows the operation of obtaining updated spectral shaper coefficient vector s(n).

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

From the foregoing it will be appreciated that, although specific embodiments of the invention have been described herein for purposes of illustration, various modifications may be made without deviating from the spirit and scope of the invention. Specifically, those having ordinary skill in the art will appreciate that while the present application describes difficulties relating to systems utilizing transmitter precoding in conjunction with non-equally spaced constellations, the teachings of the present application are not limited to such systems, but are instead applicable to all communications systems analogous to those described in the application. Accordingly, the invention is not limited except as by the appended claims.

What is claimed is:

1. A pulse amplitude modulation (PAM) data communication system comprising:
   a bits to PAM encoder configured to receive a group of bits and operable to encode the group of bits into discrete voltage level pulses;
   a precoder coupled to the PAM encoder and configured to receive the discrete voltage pulses and operable to generate precoded symbols,
   the precoder containing a precoder filter operable on the discrete voltage pulses to compensate for amplitude and phase distortion caused by propagation of a transmitted signal via a communication channel;
   a spectral shaper contained in the precoder and operable to provide spectral whitening of the precoded symbols by minimizing unwanted signal components; and
   a pre-filter coupled to the precoder and configured to receive the precoded symbols, the pre-filter having filter coefficients to compensate for channel phase distortion when used in conjunction with the precoder filter,
   wherein the precoded symbols are transmitted over the communication channel.

2. The PAM data communication system of claim 1, wherein the system is a modem.

3. The PAM data communication system of claim 1, wherein an input of the precoder filter is operably coupled, through a summing junction, to an output of an extended PAM constellation mapper.

4. The PAM data communication system of claim 1, wherein an output of the precoder filter is operably coupled, through a summing junction, to the spectral shaper.

5. The PAM data communication system of claim 1, wherein an output of the precoder filter is operably coupled, through a summing junction, to a selection block.

6. The PAM data communication system of claim 5, wherein the selection block performs selection to substantially minimize the power of the output of the precoder filter under a modulo scheme.

7. The PAM data communication system of claim 6, wherein an output of the selection block is operably coupled, through a summing junction, to an input of an extended PAM constellation mapper.

* * * * *